(12) United States Patent
Kamei et al.

(10) Patent No.: US 7,733,219 B2
(45) Date of Patent: Jun. 8, 2010

(54) SENSOR ASSEMBLY

(75) Inventors: Takahiro Kamei, Wako (JP); Yoshimasa Eguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/187,696

(22) Filed: Aug. 7, 2008

(65) Prior Publication Data

US 2009/0038403 A1 Feb. 12, 2009

(30) Foreign Application Priority Data

Aug. 8, 2007 (JP) ............................. 2007-207047
Aug. 8, 2007 (JP) ............................. 2007-207081

(51) Int. Cl.
*G01L 1/00* (2006.01)
*G01N 3/08* (2006.01)
*B60Q 1/00* (2006.01)
*B60T 7/22* (2006.01)

(52) U.S. Cl. ............. 340/436; 296/187.04; 296/187.09; 180/274; 280/734; 73/777; 73/818

(58) Field of Classification Search ........... 73/775–777, 73/765, 778; 293/102, 117; 340/436; 180/274; 280/734–735; 296/187.04, 187.09
See application file for complete search history.

(56) References Cited

U.S. PATENT DOCUMENTS

| | | | | |
|---|---|---|---|---|
| 6,559,763 B2 * | 5/2003 | Murphy et al. | ............... | 340/436 |
| 6,744,354 B2 * | 6/2004 | Stephan et al. | ............... | 340/436 |
| 6,784,792 B2 * | 8/2004 | Mattes et al. | ............... | 340/436 |
| 6,929,282 B1 * | 8/2005 | Zoratti et al. | ............... | 340/436 |
| 6,997,060 B2 * | 2/2006 | Morikawa | .................... | 73/775 |
| 7,293,809 B2 * | 11/2007 | Suzuki et al. | .................. | 73/774 |
| 7,304,566 B2 * | 12/2007 | Mae et al. | .................... | 340/436 |
| 7,331,415 B2 * | 2/2008 | Hawes et al. | ................. | 340/436 |
| 7,484,779 B2 * | 2/2009 | Takahashi | .................... | 293/117 |
| 7,488,015 B2 * | 2/2009 | Lu et al. | ...................... | 293/117 |
| 7,497,491 B2 * | 3/2009 | Zanella et al. | .............. | 340/436 |
| 7,541,917 B2 * | 6/2009 | Hosokawa | ................... | 340/436 |

(Continued)

FOREIGN PATENT DOCUMENTS

JP    2005-263038    9/2005

(Continued)

OTHER PUBLICATIONS

Mirow, Paul. "High Resolution Piezo Film Sensor Systems for Automotive Applications" Advanced Microsystems for Automotive Applications 2003. VDI-Buch, Part 2, Sub Part 1, pp. 249-259. <http://www.springerlink.com/content/kv13242200I6540r/>.*

*Primary Examiner*—Lisa M Caputo
*Assistant Examiner*—Jonathan Dunlap
(74) *Attorney, Agent, or Firm*—Rankin, Hill & Clark LLP

(57) ABSTRACT

A sensor assembly includes a elongate article and a plurality of elongate piezoelectric elements provided to the elongate article. Each of the piezoelectric elements is configured so that when a load is applied in a direction perpendicular to a surface of the piezoelectric element, a short axis direction of the piezoelectric element becomes a sensitivity direction in which a voltage is generated, and a major axis direction becomes a non-sensitivity direction in which a voltage is not generated.

9 Claims, 11 Drawing Sheets

U.S. PATENT DOCUMENTS

| | | | |
|---|---|---|---|
| 7,575,086 B2 * | 8/2009 | Kamei et al. | 340/436 |
| 2002/0154006 A1 * | 10/2002 | Murphy et al. | 340/436 |
| 2002/0180596 A1 * | 12/2002 | Mattes et al. | 340/436 |
| 2004/0066286 A1 * | 4/2004 | Stephan et al. | 340/436 |
| 2005/0104721 A1 * | 5/2005 | Mae et al. | 340/436 |
| 2005/0193828 A1 * | 9/2005 | Morikawa | 73/777 |
| 2007/0114803 A1 * | 5/2007 | Takahashi et al. | 293/102 |
| 2007/0164574 A1 * | 7/2007 | Tanabe | 293/102 |
| 2007/0200692 A1 * | 8/2007 | Kamel et al. | 180/274 |
| 2008/0122599 A1 * | 5/2008 | Suzuki et al. | 340/436 |

FOREIGN PATENT DOCUMENTS

| | | | |
|---|---|---|---|
| JP | 2006194669 A | * | 7/2006 |
| JP | 2007223531 A | * | 9/2007 |
| WO | 2004/070336 | | 8/2004 |
| WO | 2005/061284 | | 7/2005 |

* cited by examiner

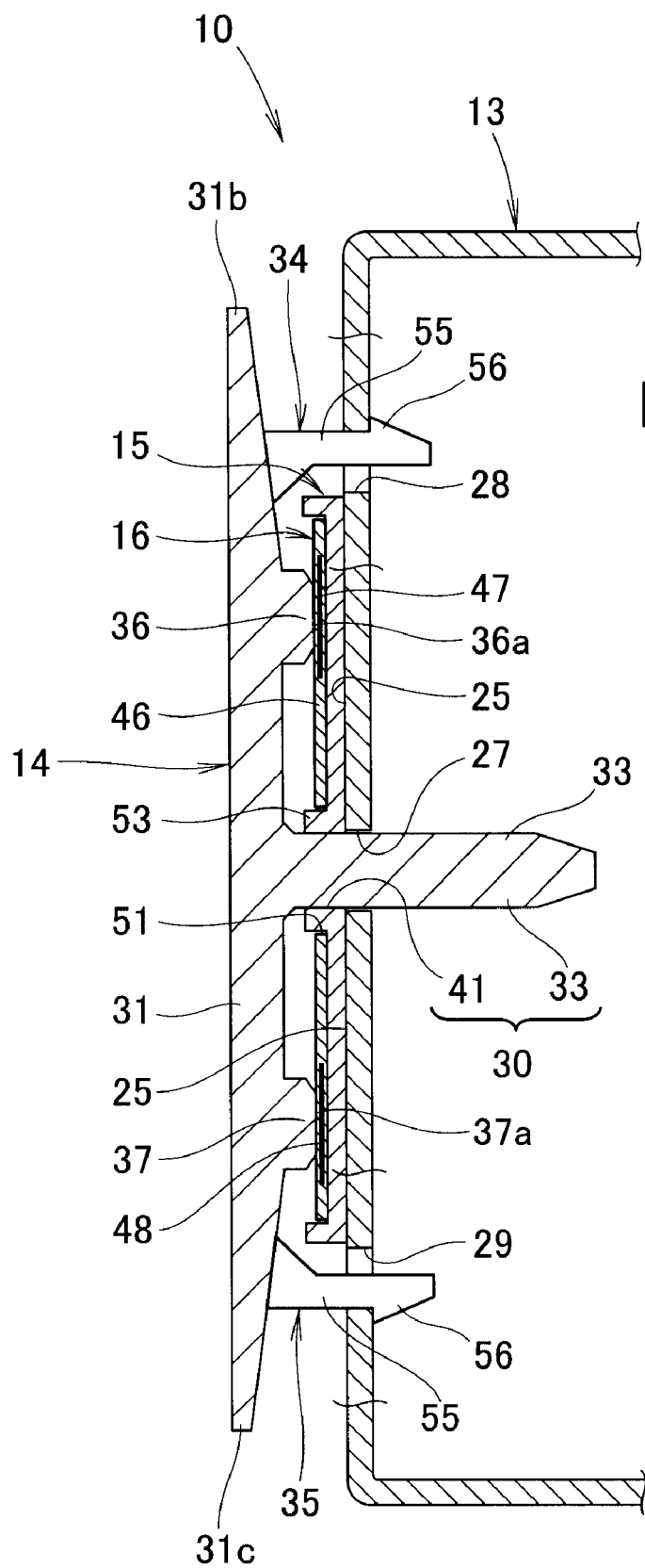

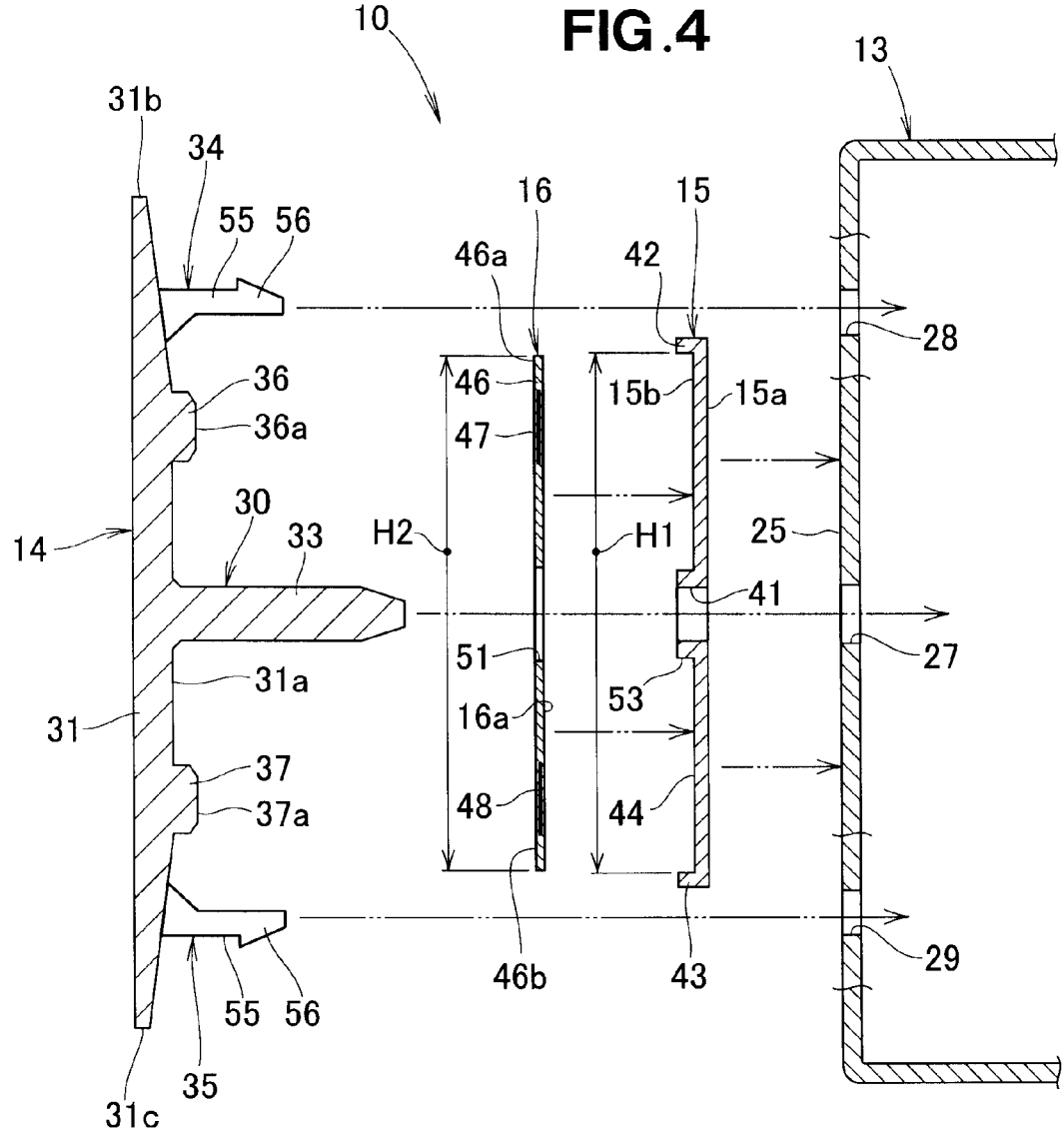

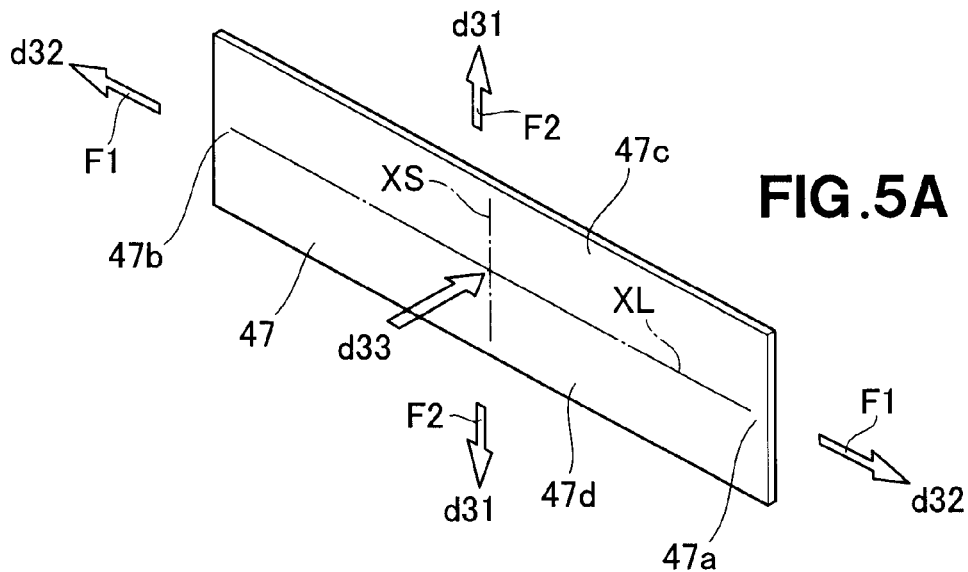
FIG.5A
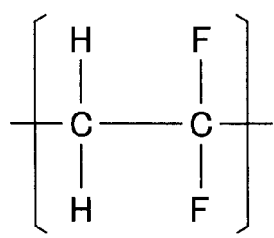
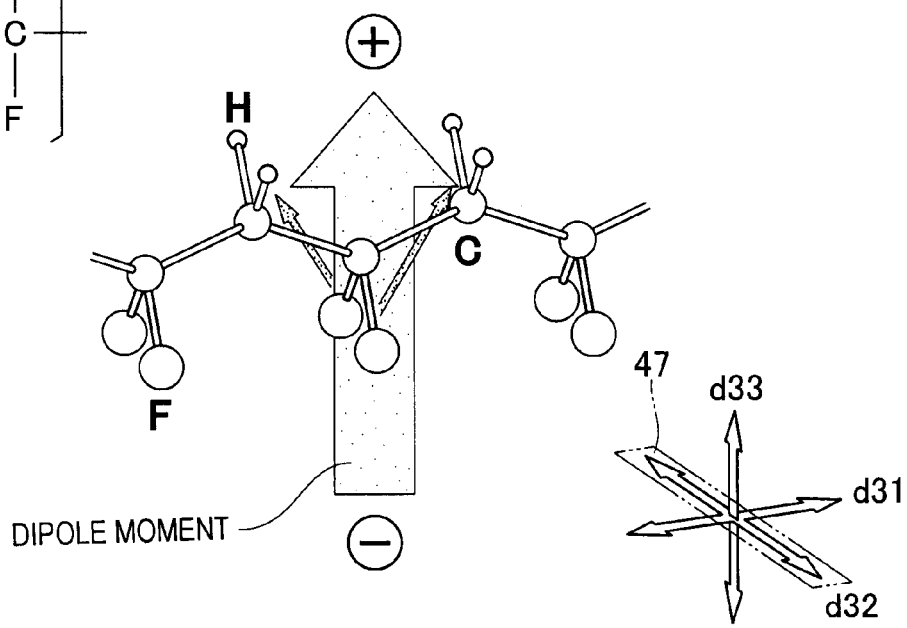
FIG.5B

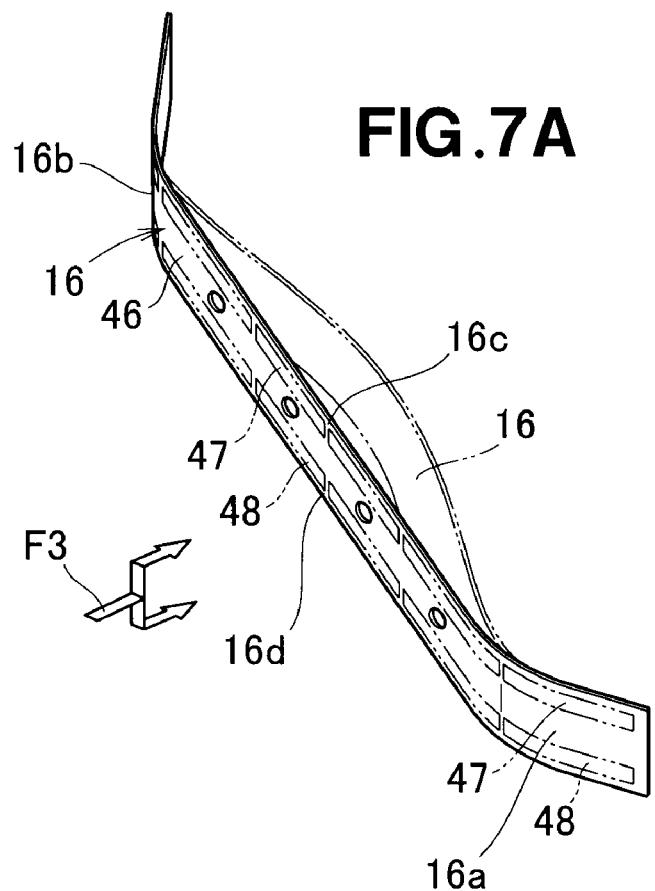
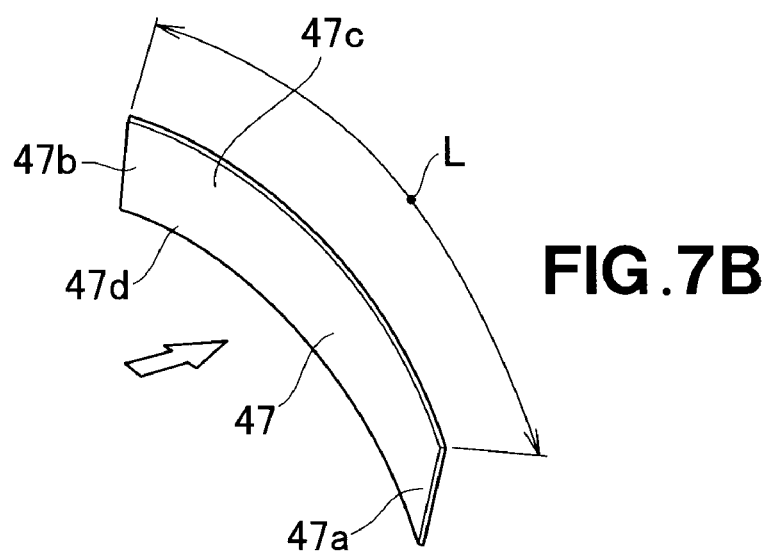

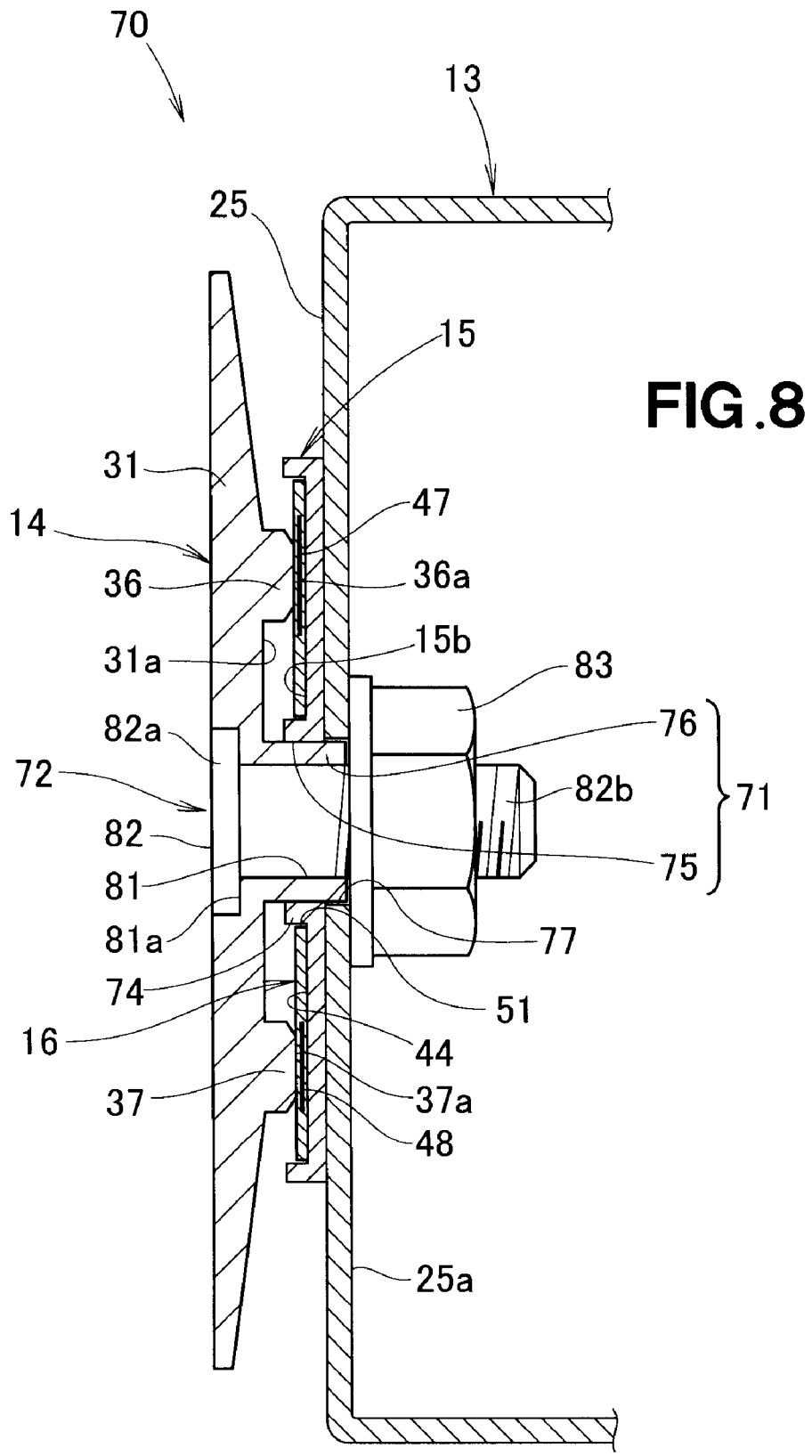

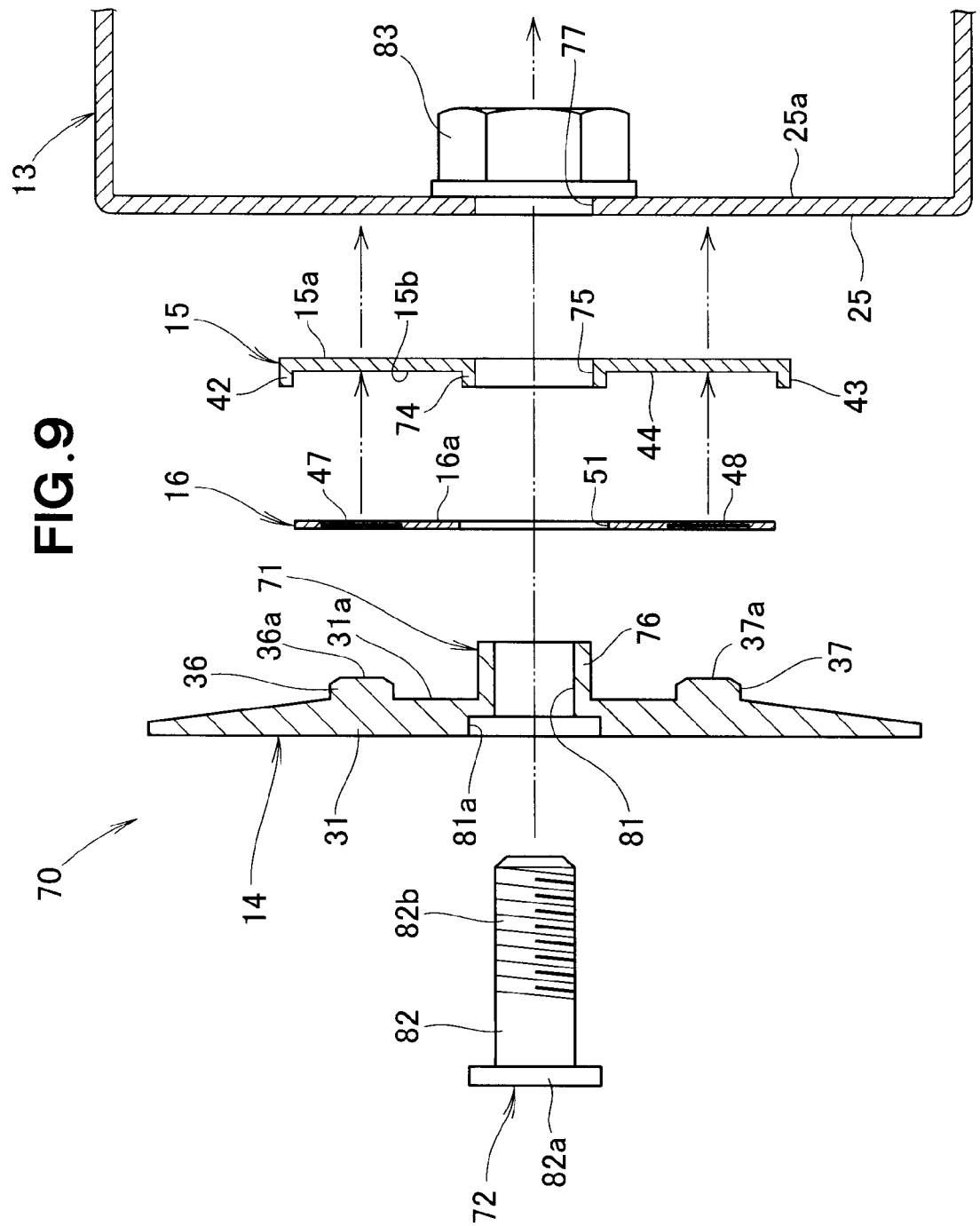

SENSOR ASSEMBLY

FIELD OF THE INVENTION

The present invention relates to a sensor assembly having a plurality of piezoelectric elements arranged along a major axis so that when a load is applied in a direction perpendicular to the surface of the piezoelectric elements, the piezoelectric elements output an electric signal in accordance with the load.

BACKGROUND OF THE INVENTION

A sensor assembly may contain a structure provided with an optical fiber as a sensor element for detecting the amount of deformation in a vehicle body. The optical fiber is held between a bumper reinforcement and a bumper cover.

For example, in Japanese Laid-Open Patent Publication No. 2005-263038 (JP 2005-263038 A), when a load is applied to a bumper cover, the load is transmitted to the optical fiber by way of the bumper cover, and the optical fiber is deformed by the transmitted load. A pedestrian detection apparatus is disclosed in which the intensity of light passing through the interior of the optical fiber is altered by deformation of the optical fiber to detect that the vehicle body has collided with a pedestrian on the basis of the altered intensity of light.

However, in order to accurately detect impact with a pedestrian by using the detection apparatus of JP 2005-263038 A, the optical fiber must suitably deform in accordance with the load at the time of impact.

If the load at the time of impact is applied to an area away from the optical fiber, deformation may be brought about by the applied load at the position away from the optical fiber in the bumper cover.

If the deformed position comes into contact with the bumper reinforcement, the load will be transmitted directly to the bumper reinforcement from the bumper cover, and will not be efficiently transmitted to the optical fiber. For this reason, it is difficult to suitably deform the optical fiber (i.e., the sensor element) in accordance with the load at the time of impact and to accurately detect the load at the time of impact.

SUMMARY OF THE INVENTION

An object of the present invention is to provide a sensor assembly capable of accurately detecting load at the time of impact.

According to an aspect of the present invention, there is provided a sensor assembly which comprises: a elongate article; and a sensor element comprised of at least one elongate piezoelectric element provided along a longitudinal direction of the elongate article. The sensor element being configured such that when a load acts in a direction that is perpendicular to a surface of the piezoelectric element, a short axis direction of the of the elongate sensor element becomes a sensitivity direction in which a voltage is generated and a longitudinal direction that is a major axis direction becomes a non-sensitivity direction in which a voltage is not generated.

In cases where the piezoelectric elements undergo bending deformation in accordance with the sensitivity direction, the load is applied in the direction of the short axis, and an electric signal is outputted. In order to accurately detect the load input by using the piezoelectric elements, it is preferable to detect only an electric signal generated by pressure exerted on the piezoelectric elements when the load is applied in a direction perpendicular to the surface of the piezoelectric elements and the pressure is exerted on the elements.

In view of the above, the longitudinal direction of the piezoelectric elements is made to match the non-sensitivity direction. Therefore, the piezoelectric elements do not output an electric signal on the basis of deformation in the longitudinal direction even when the piezoelectric elements undergo bending deformation in accordance with the longitudinal direction. Only an electric signal generated by pressure can thereby be detected, and the load at the time of impact can be accurately detected, when a load is applied in a direction perpendicular to the surface of the piezoelectric elements and the pressure is exerted on the elements.

Preferably, the sensor assembly includes a first member disposed even further frontward of a vehicle body than the sensor element and having a load-transmitting part extending toward the sensor element, and a second member disposed between the first member and the vehicle body for supporting the sensor element, wherein the first member and second member are positioned relative to each other in a vertical direction using a positioning part, whereby the load-transmitting part is made to face the sensor elements.

For example, when the load at the time of impact is applied to the first member, the applied load will therefore be efficiently transmitted from the load-transmitting parts to the sensor elements even if an area of the first member away from the sensor elements is deformed. The sensor elements are thereby allowed to suitably deform in accordance with the load at the time of impact, and the impact can be accurately detected.

Desirably, the first member includes a mounting part to be mounted to the vehicle body, and the mounting part is configured so as to limit movement of the first member and the vehicle body only to a direction away from each other. The first member can therefore be prevented by the mounting parts from separating from the vehicle body. On the other hand, when a load is applied to the first member at the time of impact, the first member is allowed to move smoothly toward the vehicle body by the applied load. The load at the time of impact can thereby be reliably transferred by the load-transmitting parts of the first member.

In a preferred form, the positioning part has a plurality of positioning holes formed in the second member, and a plurality of insertion parts capable of being inserted into the positioning holes, and the insertion parts are introduced through the positioning holes, whereby the first member and the second member are positioned relative to each other in the vertical direction. The sensor elements of the second member can therefore be made to face the load-transmitting parts. The sensor elements of the second member can thus be made to face the load-transmitting parts by the simple process of merely introducing the insertion parts through the positioning holes.

It is preferred that the load-transmitting part be provided to at least one area among areas above or below the insertion part. The load-transmitting parts can therefore be provided in the vicinity of the insertion parts and can be placed in an even more accurate position relative to the sensor elements. The load-transmitting parts can thereby be made to face the sensor elements even more reliably.

Preferably, the load-transmitting parts are positioned between the plurality of mounting parts for mounting the first member to the vehicle body and the insertion part provided to the first member. Therefore, when a load is applied to the first component, slipping of the load-transmitting parts relative to the sensor elements can be prevented by the mounting parts and the insertion parts. The load-transmitting parts can thereby be in a state of facing the sensor elements, and the load at the time of impact can be even more efficiently transmitted from the load-transmitting parts to the sensor elements.

Desirably, the load-transmitting parts and the sensor elements are provided, respectively, above and below the insertion part. Therefore, when a load is applied to the first member, the top and bottom load-transmitting parts can be guided in the same manner by the insertion parts to the top and bottom sensor elements. In guiding the respective top and bottom load-transmitting parts in the same manner, each of the sensor elements can be deformed in the same manner by the top and bottom load-transmitting parts. The load generated due to impact can thereby be detected with further accuracy without influence by the point of application (input point) of the load.

In a preferred form, the positioning part is provided between the mounting part and the second member. Therefore, when the first member is mounted to the vehicle body, positional slippage between the vehicle body and the first member, specifically, positional slippage of the first member relative to the second member can be effectively reduced.

Preferably, the sensor element is comprised of a polyvinylidene fluoride piezoelectric film, and when the sensor element is provided to the elongate article, the longitudinal direction of the sensor element is in alignment with the longitudinal direction of the elongate article.

When the load is applied in the longitudinal direction of the elongate article, the elongate article will undergo bending deformation about (based on) both ends of the elongate article. The bending deformation of the elongate article causes the piezoelectric elements provided to the elongate article to undergo bending deformation in conformity with the elongate article. Therefore, when the sensitivity direction of the piezoelectric element is made to match the longitudinal direction of the elongate article, a state is established in which the load is applied in the sensitivity direction of the piezoelectric element, and an electric signal is outputted. For this reason, when the load is applied in a direction perpendicular to the surface of the piezoelectric elements, and pressure is exerted on the piezoelectric elements, it is difficult to detect only an electric signal generated by the pressure, and the load input cannot be accurately detected.

In view of the above, when the piezoelectric elements are provided to the elongate article, the longitudinal direction of the piezoelectric elements (that is, the non-sensitivity direction) is made to match the longitudinal direction of the elongate article.

Polyvinylidene fluoride is readily made into a thin film, making it possible to design the sensors to be made thinner and more compact Making the longitudinal direction (that is, the non-sensitivity direction) of the piezoelectric elements match the longitudinal direction of the elongate article when the piezoelectric elements are provided to the elongate article makes it possible to detect only an electric signal generated by pressure exerted on the piezoelectric elements and to accurately detect a load generated due to impact when the load is applied in a direction perpendicular to the surface of the piezoelectric elements and the pressure is generated, even in cases in which the piezoelectric elements undergo bending deformation in response to the deformation of the elongate article.

BRIEF DESCRIPTION OF THE DRAWINGS

Certain preferred embodiments of the present invention will be described in detail below, by way of example only, with reference to the accompanying drawings, in which:

FIG. 3 is a cross-sectional view taken along line 3-3 of FIG. 1;

FIG. 4 is an exploded view showing the arrangement of FIG. 3;

FIG. 5A is a perspective view showing the sensor element of FIG. 2, and

FIG. 5B is a view showing the molecular structure of the sensor element of FIG. 5A;

FIG. 7A illustrates a state in which a load is applied to the sensor element unit of FIG. 2, and FIG. 7B illustrates a state in which the load is applied to the top sensor element of FIG. 7A;

FIG. 8 is a cross-sectional view showing a sensor assembly according to a second embodiment of the present invention;

FIG. 9 is an exploded view showing the sensor assembly of FIG. 8;

DETAILED DESCRIPTION OF THE PREFERRED EMBODIMENTS

An example in which a sensor assembly 10 is installed in a front bumper beam 13 of a vehicle is described in the present embodiment, but the invention may also be applied to other elongate articles.

Reference is now made to FIGS. 1 through 4 showing the sensor assembly 10 according to the first embodiment of the present invention.

Figure 1:
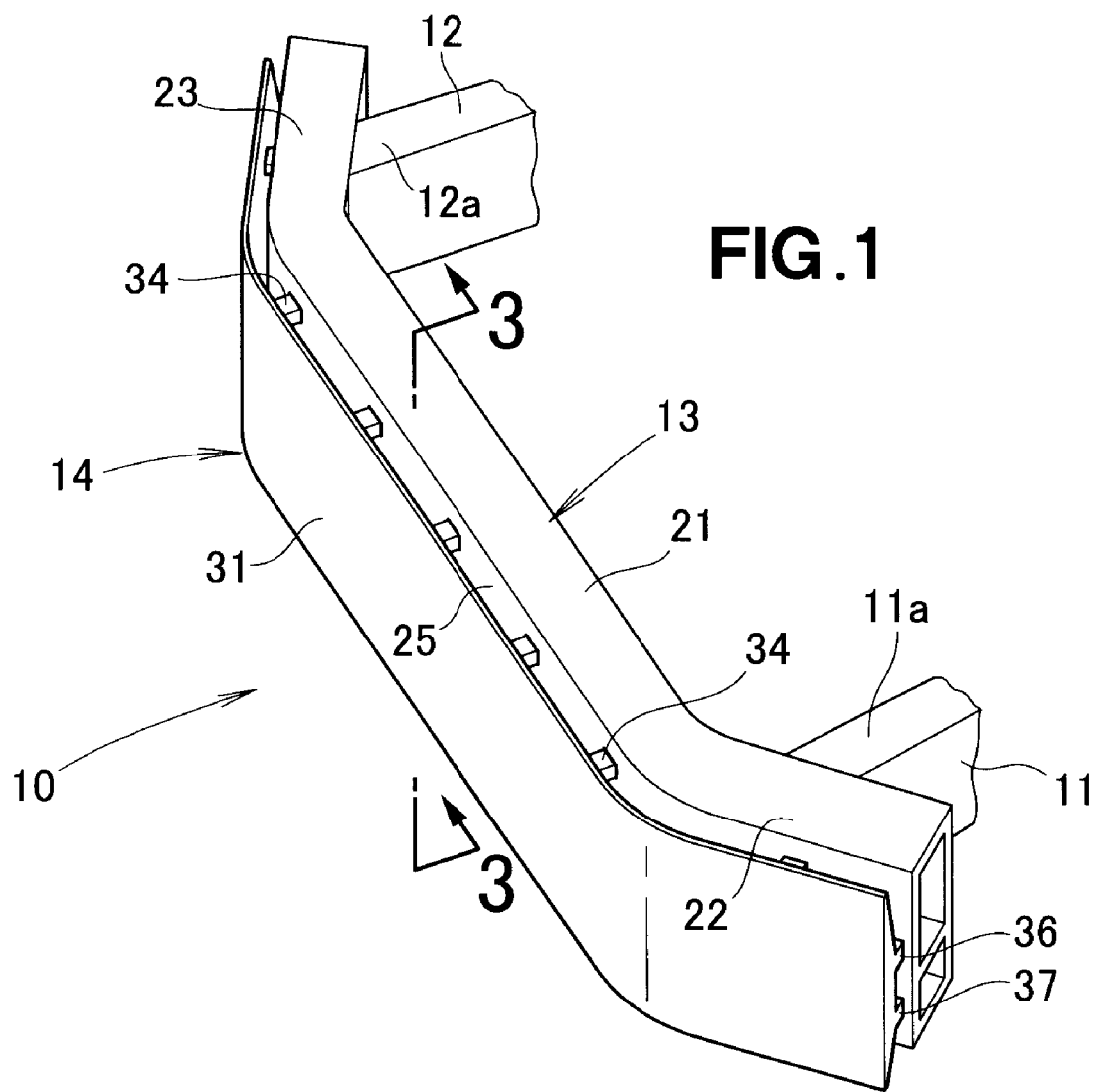
FIG. 1 is a perspective view showing a sensor assembly according to a first embodiment of the present invention.
Figure 2:
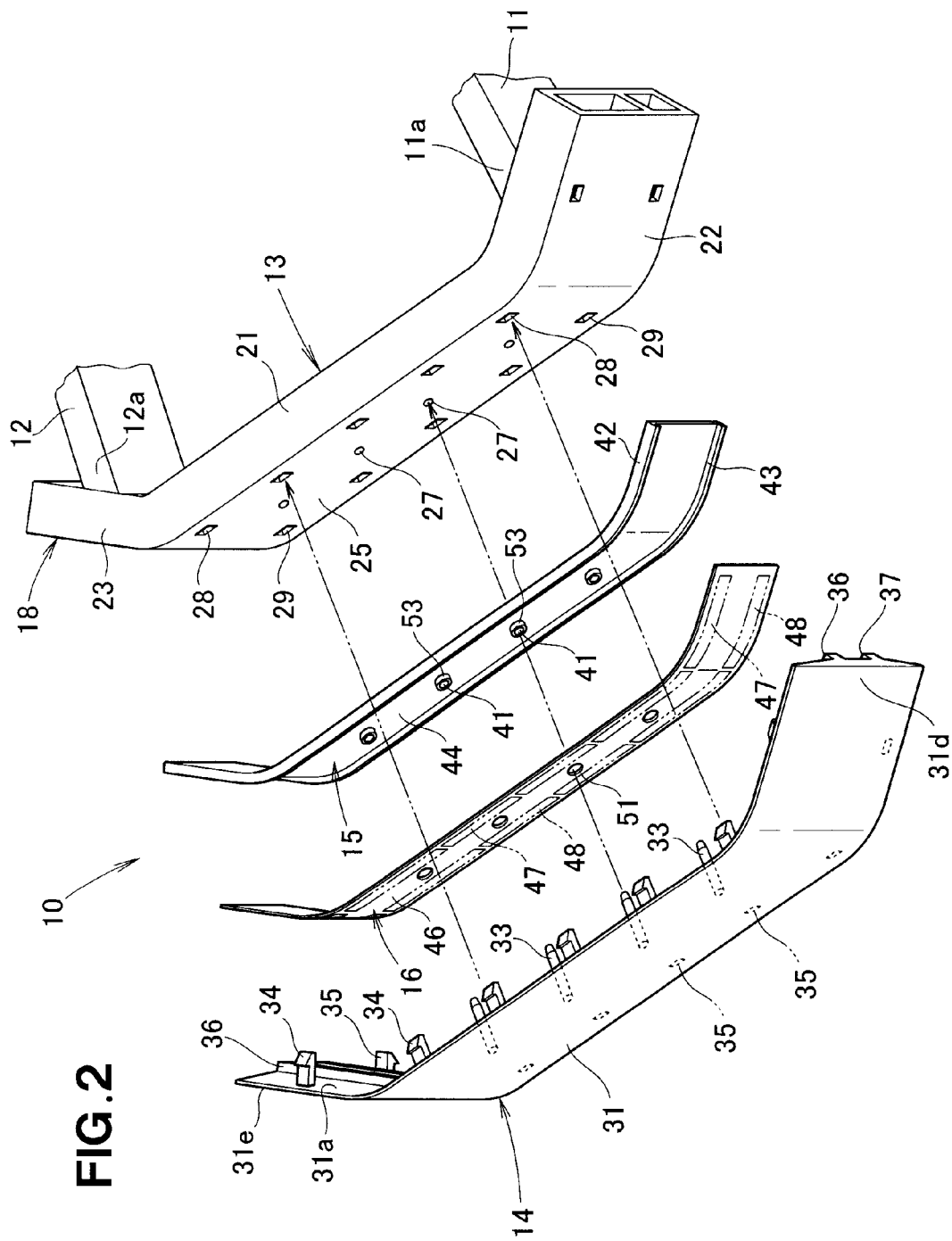
FIG. 2 is an exploded perspective view showing the sensor assembly of FIG. 1.

As shown in FIGS. 1 and 2, the sensor assembly 10 is provided with the front bumper beam 13 mounted to left and right front side frames 11, 12, a first member 14 mounted to the front bumper beam 13, a second member 15 disposed between the first member 14 and the front bumper beam 13, and a sensor element unit 16 supported by the second member 15.

The front bumper beam 13 is mounted to the each of the front parts 11a, 12a of the left and right front side frames 11, 12, and constitutes one part of a vehicle body 18.

The front bumper beam 13 is a elongate article provided with a center part 21 extending in a width direction of the vehicle, a left slanted part 22 formed so that the left end of the center part 21 is slanted facing backward, and a right slanted part 23 formed so that the right end of the center part 21 is slanted facing backward.

A plurality of insertion holes 27 is formed at prescribed intervals in a vertically central part of the front wall of the front bumper beam 13.

A plurality of upper locking holes 28 is formed at prescribed intervals in the vicinity of the upper side in the front wall of the front bumper beam 13.

A plurality of lower locking holes 29 is formed at prescribed intervals in the vicinity of the lower side in the front wall of the front bumper beam 13.

The first member 14 is provided with a belt-shaped beam cover 31 that extends along an front wall 25 of the front bumper beam 13, a plurality of insertion parts 33 on a rear face 31a of the beam cover 31, a plurality of upper and lower mounting parts 34, 35, and upper and lower load-transmitting parts 36, 37.

The insertion parts 33, the upper and lower mounting parts 34, 35, and the upper and lower load-transmitting parts 36, 37 are described in detail below with reference to FIGS. 3 and 4.

The second member 15 is a belt-shaped member that is interposed between the first member 14 and the front bumper beam and that extends along the front wall 25 of the front bumper beam 13. The second member 15 is, for example, bonded to (supported on) the front wall 25 of the front bumper beam 13 by using double-sided adhesive tape (not shown). A plurality of positioning holes 41 is formed at prescribed intervals in a vertically central part of the second member 15. The second member 15 is provided with an upper lip 42 on the top side, a lower lip 43 on the bottom side, and a sensor-supporting face 44 between the upper and lower lips 42, 43. The upper lip 42 protrudes from the top side toward the front of the vehicle body. The lower lip 43 protrudes from the bottom side toward the front of the vehicle body. The sensor-supporting face 44 is a surface for supporting the sensor element unit 16.

The positioning holes are described in detail below with reference to FIGS. 3 and 4.

The sensor element unit 16 is a elongate article provided with a laminate 46 formed in a belt shape along the sensor-supporting face 44, a plurality of upper sensor elements (piezoelectric elements) 47 embedded along the top side of the laminate 46, and a plurality of lower sensor elements (piezoelectric elements) 48 embedded along the bottom side of the laminate 46.

A plurality of fitting holes 51 is formed at prescribed intervals in a vertically central part of the laminate 46.

The upper and lower sensor elements 47, 48 are belt-shaped (elongate) elements laid out in the transverse direction.

The sensor element unit 16 is provided to the front bumper beam 13 via the second member 15 by, for example, being bonded to (supported on) the sensor supporting face 44 of the second member 15 by using double-sided adhesive tape (not shown).

In referring to FIGS. 3 and 4, in the second member 15, a plurality of bosses 53 (see also FIG. 2) is formed at prescribed intervals in a vertically central part of a surface 15b, and a positioning hole 41 is formed in each of these bosses 53. The plurality of positioning holes 41 is comprised of through-holes.

The sensor-supporting face 44 is formed between the upper and lower lips 42, 43 in the surface 15b of the second member 15. A height dimension of the sensor-supporting face 44 is H1.

In the sensor element unit 16, a height dimension of the laminate 46 is set at H2. The height dimension H2 of the laminate 46 is set slightly less than the height dimension H1 of the sensor element unit 16.

The upper sensor elements 47 are embedded in the vicinity of a top side 46a of the laminate 46. The upper sensor elements 47 are provided further upward than the insertion parts 33.

The lower sensor elements 48 are embedded in the vicinity of a bottom side 46 of the laminate 46. The bottom sensor elements 48 are provided further downward than the insertion parts 33.

A piezoelectric film is used for the upper and lower sensor elements 47, 48. That is, the upper and lower sensor elements 47, 48 are elements that, when a load is inputted (applied) in a direction perpendicular to the surface of each of the sensor elements 47, 48 and strain is generated, an electric signal is outputted in response to the amount of strain produced (inputted load).

The upper and lower sensor elements 47, 48 are described in detail below with reference to FIG. 5A and FIG. 5B by using the upper sensor element 47 as an example.

The sensor element unit 16 is bonded to the sensor-supporting face 44 of the second member 15 using double-sided adhesive tape (not shown). The plurality of bosses 53 of the second member 15 is fitted to the fitting holes 51 of the laminate 46, whereby the sensor element unit 16 is positioned in a prescribed position by the plurality of bosses 53. Simultaneously, in the sensor element unit 16, the top and bottom sides 46a, 46b are positioned in a prescribed position by the upper and lower lips 42, 43 of the second member 15. The sensor element part 16 can thereby be reliably positioned in a prescribed position relative to the second member 15.

The first member 14 is provided further toward the front of the vehicle body than the sensor element unit 16.

The upper mounting part 34 of the first member 14 is an elastically deformable locking member extending toward the back of the vehicle body from the vicinity of the top side 31b on the rear face 31a of the beam cover 31.

The upper mounting part 34 has locking hooks 56 formed facing upward at a distal end portion of projections 55. The locking hooks 56 prevent the projections 55 from disengaging from the upper locking holes 28 toward the front of the vehicle body by locking onto the rim part of the upper locking hole 28 of the front bumper beam 13.

The lower mounting part 35 of the first member 14 is a member vertically symmetrical with the upper mounting part 34; the same numerical symbols are assigned to each component, and a description thereof is omitted. The locking hooks 56 of the lower mounting part 35 lock onto the rim part of the lower locking holes 29 of the front bumper beam 13.

The upper load-transmitting part 36 of the first member 14 is continuously formed on the rear face 31a of the beam cover 31 from a left end 31d of the beam cover 31 across to the a right end 31e (see FIG. 2) below the vicinity of the upper mounting part 31.

The upper load-transmitting part 36 is a protrusion that extends toward the back of the vehicle body (that is, toward the upper sensor elements 47) and is provided above the insertion parts 33. Specifically, the upper load-transmitting part 36 is positioned between the upper mounting part 34 and the insertion parts 33.

The lower load-transmitting part 37 of the first member 14 is a member vertically symmetrical with the upper load-transmitting part 36 and is provided below the insertion parts 33. Specifically, the lower load-transmitting part 37 is positioned between the lower mounting part 35 and the insertion parts 33.

Slipping of the upper and lower load-transmitting parts 36, 37 relative to the upper and lower sensor elements 47, 48 can therefore be prevented by the upper and lower mounting parts 34, 35 and the insertion parts 33, even when a load is applied to the first member 14.

Components of the lower load-transmitting part 37 are assigned the same numerical symbols as the components of the upper load-transmitting part 36, and a description thereof is omitted.

The insertion parts 33 of the first member 14 are columnar projecting parts extending from the vertically central part toward the back of the vehicle body on the rear face 31a of the beam cover 31. The insertion parts 33 can be introduced through the positioning holes 41 of the second member 15 and through the insertion holes 27 of the front bumper beam 13.

The first member 14 and the second member 15 can be positioned relative to each other in the vertical direction by introducing the insertion parts 33 through the positioning holes 41 with the use of the positioning part 30. A contact face 36a of the upper load-transmitting part 36 will thereby be placed opposite the upper sensor elements 47, and a contact face 37a of the lower load-transmitting part 37 will be placed opposite the lower sensor elements 48.

Specifically, the insertion parts 33 of the first member 14 and the positioning holes 41 of the second member 15 constitute the positioning part 30 for positioning the upper and lower load-transmitting parts 36, 37 and the upper and lower sensor elements 47, 48.

Next, the installation procedures of the sensor assembly 10 are described with reference to FIGS. 3 and 4.

First, the sensor element unit 16 is bonded to the sensor-supporting face 44 of the second member 15 by using double-sided adhesive tape (not shown).

Next, the second member 15 is bonded to the front wall 25 of the front bumper beam 13 by using double-sided adhesive tape (not shown).

The insertion parts 33 of the first member 14 are then introduced through the positioning holes 41 of the second member 15 and the insert holes 27 of the front bumper beam 13, whereupon the upper and lower load-transmitting parts 36, 37 come into contact with the upper and lower sensor elements 47, 48.

At the same time as the insertion parts 33 are inserted into the positioning holes 41 and the insert holes 27, the upper and lower mounting parts 34, 35 are inserted into the respective locking holes 28, 29 of the front bumper beam 13. The upper and lower mounting parts 34, 35 are inserted into the upper and lower locking holes 28, 29 while undergoing elastic deformation, and the locking hooks 56, 56 of the upper and lower mounting parts 34, 35 lock onto the rim parts of the upper and lower locking holes 28, 29. The first member 14 is mounted to the front wall 25 of the front bumper beam 13. In the process, the contact faces 36a, 37a of the upper and lower load-transmitting parts 36, 37 are bonded to the sensor element unit 16 by using double-sided adhesive tape or an adhesive (not shown).

The locking hooks 56, 56 of the upper and lower mounting parts 34, 35 are thus locked onto the rim parts of the upper and lower locking holes 28, 29, whereby the upper and lower mounting parts 34, 35 (that is, the first member 14) is prevented from disengaging from the upper and lower locking holes 28, 29 toward the front of the vehicle body. By contrast, movement of the upper and lower mounting parts 34, 35 toward the back of the vehicle body is not restricted. The upper and lower mounting parts 34, 35 are therefore configured so that the first member 14 and front bumper beam 13 are only restricted from moving away from each other.

Through such a structure, the first member 14 can move smoothly due to a load applied toward the vehicle body 18 when the load is applied to the first member 14 at the time of impact, and the load at the time of impact can be reliably transmitted via the upper and lower load-transmitting parts 36, 37 to the upper and lower sensor elements 47, 48.

Reference is now made to FIG. 5A showing the sensor element, and to FIG. 5B showing the molecular structure of the sensor element.

The upper and lower sensor elements 47, 48 are identical sensor elements. Therefore, the upper sensor elements 47 will be described while a description of the lower sensor elements 48 will be omitted.

A regular piezoelectric film can be used for the upper sensor elements 47 shown in FIG. 5A. This piezoelectric film is, for example, polyvinylidene fluoride (PVDF). Since PVDF can be easily made into a thin film, the entire sensor can be made thinner and more compact.

As shown in FIG. 5B, PVDF has a readily deforming direction and a non-readily deforming direction in terms of the molecular structure ($-CH_2CF_2-$). Specifically, PVDF has a special characteristic wherein polarization is produced by a change in dipole moment with deformation in the direction of a short axis XS of the surface (direction d31) or deformation in a direction perpendicular to the surface (direction shown by arrow d33).

PVDF has a special characteristic wherein polarization is not produced by a change in dipole moment with deformation in the direction of a long axis XL, which is the longitudinal direction of the surface (direction shown by arrow d32), because the symmetry of the molecular structure is preserved.

That is, the direction of a short axis XS of the surface (direction d31) is the aforementioned "sensitivity direction," and the direction of a long axis XL (direction shown by arrow d32), which is perpendicular to the short axis, is the "non-sensitivity direction."

Thus, polarization is produced by a change in dipole moment and voltage (polarization voltage) is generated in the upper sensor elements 47 when a load (compression/pressing force) is applied in a direction perpendicular to the surface (direction d33). Polarization is produced by a change in dipole moment and voltage (polarization voltage) is generated (high sensitivity is obtained) when a tensile force is applied in the sensitivity direction (direction d31) at this time. Polarization is not produced by a change in dipole moment and voltage is therefore not generated (low sensitivity is obtained) when a tensile force applied in the non-sensitivity direction (direction d32).

As shown in FIG. 2, the sensor element unit 16 is formed so as to extend in the width direction of the vehicle (that is, the left-right direction) and is a elongate article formed with a short dimension in the vertical direction. Therefore, when a load is applied in the direction (d33) perpendicular to the surface of the sensor element unit 16, the sensor element unit 16 undergoes bending deformation in the longitudinal direction about (based on) the left and right ends of the elongate article. Below, bending deformation of the sensor element unit 16 in the longitudinal direction is referred to as "longitudinal deformation."

When the sensor element unit 16 undergoes longitudinal deformation, left and right ends 47a, 47b of the upper sensor elements 47 (see FIG. 5A) similarly undergo bending deformation (longitudinal deformation). The entire length of the longitudinally deformed upper sensor elements 47 is greater than that of the upper sensor elements 47 before deformation. That is, when the upper sensor elements 47 are deformed longitudinally, a tensile force in the non-sensitivity direction is applied to the upper sensor elements 47.

In contrast, the sensor element unit 16 has a short vertical dimension. Therefore, the top and bottom sides 47c, 47d of the sensor element unit 16 are unlikely to undergo bending deformation in the direction of the short axis (short axis deformation) when a load is applied in a direction (d33) perpendicular to the surface of the sensor element unit 16. That is, the upper sensor elements 47 shown in FIG. 5A are unlikely to undergo vertical deformation, and tensile force is therefore not applied in the sensitivity direction (d31), when a load is applied in a direction perpendicular to the surface of the sensor element unit 16.

Here, in order to detect only the load at the time of impact with the aid of the upper sensor elements 47, only an electric signal generated by compression/pressing force must be detected when the upper sensor elements 47 are subjected to the compression/pressing force as a result of a pressing force applied in a direction perpendicular to the surface.

In view of the above, the longitudinal direction of the upper sensor elements 47 shown in FIG. 5A is made to match the non-sensitivity direction. Therefore, voltage is not generated even if a tensile force F1 is applied in the longitudinal direction. When a tensile force F2 is applied in the direction of the short axis voltage is generated.

However, it is possible to detect only an electric signal from the compression/pressing force solely in the thickness direction of the upper sensor elements 47 and accurately detect the load generated from impact without generating tensile force in the direction of the short axis. This is because the upper sensor elements 47 are unlikely to deform in the direction of the short axis, as described above.

Figure 6:
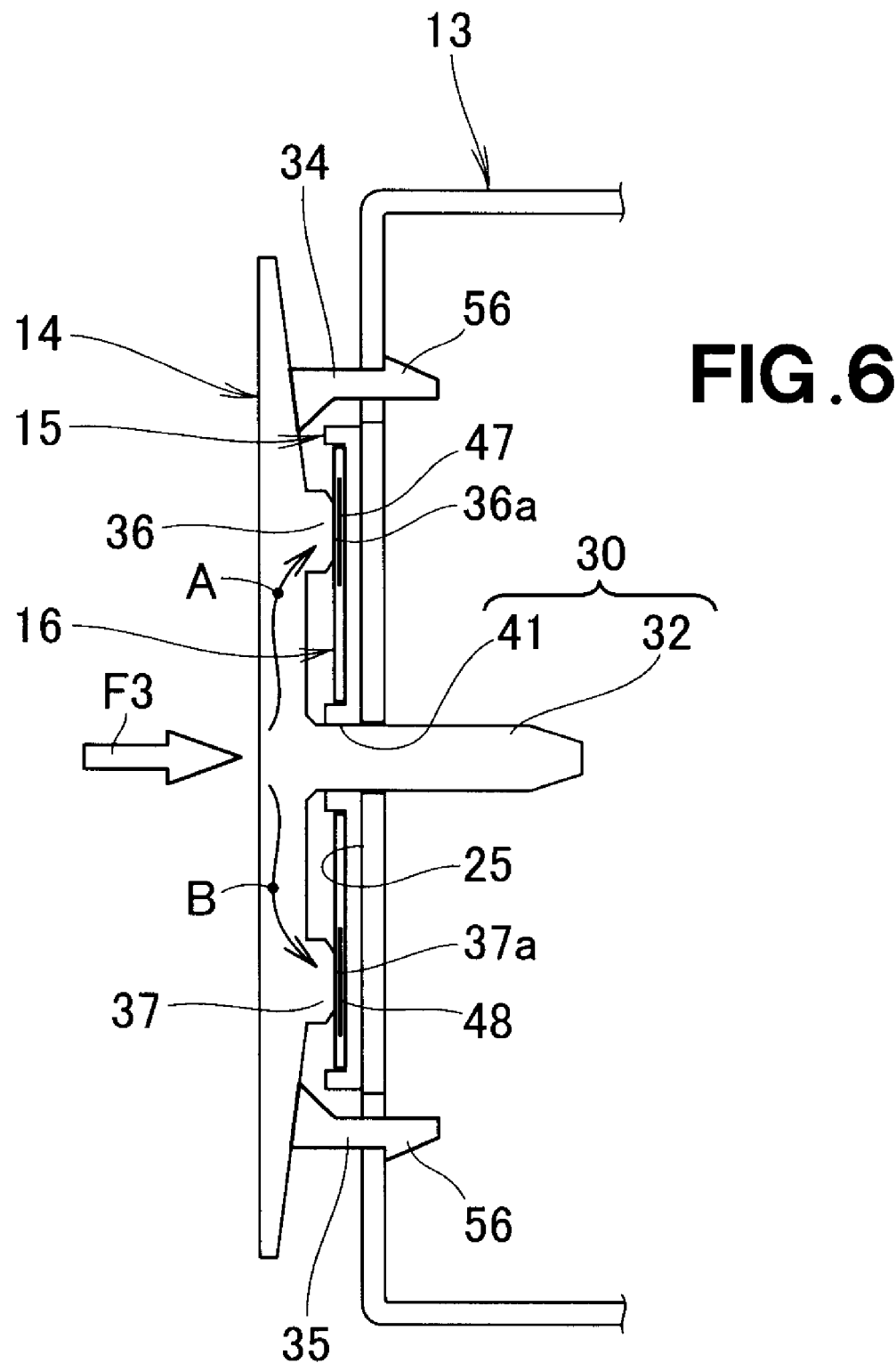
FIG. 6 is a view showing an example in which a load is applied to the first member of the sensor assembly of FIG. 3.

FIG. 6 shows an example in which a load is applied to the first member 14 of the sensor assembly of the first embodiment.

A load F3 is applied as shown by the arrows to the first member 14 from the front side of the vehicle body. The load F3 is a load applied in a direction perpendicular to the surface of the upper and lower sensor elements 47, 48.

The contact face 36a of the upper load-transmitting part 36 and the contact face 37a of the lower load-transmitting part 37 are each bonded to the sensor element unit 16. Part of the load F3 is transmitted to the upper load-transmitting part 36 as shown by arrow A, and the remainder of the load F3 is transmitted to the lower load-transmitting part 37 as shown by arrow B. Therefore, the load transmitted to the upper load-transmitting part 36 is applied in a direction perpendicular to the surface of the upper sensor elements 47, and a pressing force is favorably applied to the upper sensor elements 47. Similarly, the load transmitted to the lower load-transmitting part 37 is applied in a direction perpendicular to the surface of the lower sensor elements 48, and a pressing force is favorably applied to the lower sensor elements 48. The load F3 is thereby efficiently applied to the upper and lower sensor elements 47, 48.

The applied load F3 is therefore efficiently transmitted from the upper and lower load-transmitting parts 36, 37 to the upper and lower sensor elements 47, 48 in the first member 14 when the load F3 at the time of impact is applied to the first member 14 even in cases in which an area away from the position of the upper and lower sensor elements 47, 48 is deformed. Specifically, the upper and lower sensors 47, 48 are suitably deformed in accordance with the load F3 at the time of impact, and the impact is accurately detected.

It is preferable that the upper and lower load-transmitting parts 36, 37 and the upper and lower sensors 47, 48 be narrowed vertically in order to concentrate a load in the sensor elements when the load is applied to the upper and lower sensors 47, 48.

Next, a state in which a load has been applied to the sensor element unit 16 is described based on FIGS. 7A and 7B.

In FIG. 7A, when the load F3 is applied to the sensor element unit 16, the sensor element unit 16 deforms toward the back of the vehicle body about (based on) the left and right ends 16a, 16b, as shown by the imaginary line. However, the sensor element unit 16 has a short vertical dimension, and therefore does not deform in the direction of the short axis about (based on) the top and bottom sides 16c, 16d toward the back of the vehicle body.

As shown in FIG. 7B, the longitudinal deformation of the sensor element unit 16 about (based on) the left and right ends 16a, 16b causes the upper sensor elements 47 to also undergo deformation in the direction of the minor axis toward the back of the vehicle body based on the left and right ends 47a, 47b.

The entire length L of the upper sensor elements 47 in the direction of the minor axis is greater than that of the upper sensor elements 47 before deformation.

In the upper sensor elements 47, the longitudinal direction (that is, the non-sensitivity direction) of the upper sensor elements 47 is made to match the longitudinal direction of the sensor element unit 16 as a elongate article. Therefore, the upper sensor elements 47 will not generate voltage even if the entire length L of the upper sensor elements 47 increases. It is thereby possible to apply the impact load in a direction perpendicular to the surface of the upper sensor elements 47 and detect only the pressing force on the upper sensor elements 47, that is, only the load at the time of impact, by using the upper sensor elements 47 and to output the load as an electric signal, and to accurately detect the load at the time of impact.

FIGS. 8 and 9 show the sensor assembly of a second embodiment. The same numerical symbols are assigned to the same components as those of the sensor assembly 10 of the first embodiment, and a description thereof is omitted.

A sensor assembly 70 according to the second embodiment of the present invention has a positioning part 71 and mounting parts 72 instead of the positioning part 30 and the upper and lower mounting parts 34, 35 of the first embodiment shown in FIGS. 3 and 4, and is otherwise configured in the same manner as the sensor assembly 10 of the first embodiment.

The positioning part 71 is provided with positioning holes 75 formed in bosses 74 of the second member 15, and insertion parts 76 provided to the rear face 31a of the first member 14.

As with the bosses 53 of the first embodiment, a plurality of bosses 74 is formed at a prescribed interval in the vertical center and the longitudinal direction (width direction of the vehicle) on the surface 15b of the second member 15. The positioning holes 75 are formed coaxially with the bosses 74.

The insertion parts 76 are columnar projecting parts extending from the vertically central part toward the back of the vehicle body on the rear face 31a of the beam cover 31. The insertion parts 76 are introduced through the positioning holes 75 of the second member 15 and fit into insertion holes 77 of the front bumper beam 13.

The first member 14 and the second member 15 can be positioned relative to each other in the vertical direction with the aid of the positioning part 71 by introducing the insertion parts 76 through the positioning holes 75. The contact face 36a of the upper load-transmitting part 36 will thereby face the upper sensor elements 47, and a contact face 37a of the lower load-transmitting part 37 will face the lower sensor elements 48.

The mounting parts 72 are provided with mounting holes 81 formed coaxially with the insertion parts 76, bolts 82 capable of being inserted into the mounting holes 81, and nuts 83 provided to the front bumper beam 13.

A plurality of the mounting holes 81 is formed at a prescribed interval along the width direction of the vehicle on the vertically central part of the first member 14.

Hexagonal socket bolts with a hexagon socket (not shown) formed in the cylindrical heads 82a can be used for the bolts 82. The nuts 83 are welded to a rear face 25a of the front wall 25 of the front bumper beam 13 so as to be coaxial with the insertion holes 77.

Next, the installation procedures of the sensor assembly 70 according to the second embodiment are described.

First, the sensor element unit 16 is bonded to the sensor-supporting face 44 of the second member 15 by using double-sided adhesive tape (not shown).

Next, the second member 15 is bonded to the front wall 25 of the front bumper beam 13 by using double-sided adhesive tape (not shown).

The insertion parts 76 of the first member 14 are then introduced through the positioning holes 75 of the second member 15 and the through insert holes 77 of the front bumper beam 13, whereupon the contact surfaces 36a, 37a of the upper and lower load-transmitting parts 36, 37 come into contact with the upper and lower sensor elements 47, 48. The bolts 82 are inserted into the mounting holes 81 in a state in which the insertion parts 76 are inserted into the positioning holes 75.

Finally, a threaded part 82b of the bolts 82 projecting from the mounting holes 81 is threadably joined with the nuts 83. The first member 14 is mounted to the front wall 25 of the front bumper beam 13 by bringing the cylindrical heads 82a of the bolts 82 into contact with the shoulders 81a of the mounting holes 81. In this process, the contact faces 36a, 37a of the upper and lower load transmitting parts 36, 37 are bonded to the sensor element unit 16 by using double-sided adhesive tape or an adhesive (not shown).

The threaded parts 82b of the bolts 82 are thus threadably joined with the nuts 83. Additionally, the cylindrical heads 82a of the bolts 82 come into contact with the shoulders 81a of the mounting holes 81. Therefore, the first member 14 will not move forward from the vehicle body.

In the sensor assembly 70 according to the second embodiment, the insertion parts 76 of the positioning holes 71 are provided between the cylindrical heads 82a of the bolts 82 and the bosses 74 of the second member 15. Therefore, when the sensor assembly 70 is mounted to the vehicle body, it is possible to effectively reduce positional slippage between the vehicle body and the first member 14; specifically, positional slippage of the first member 14 relative to the second member 15.

Figure 10:
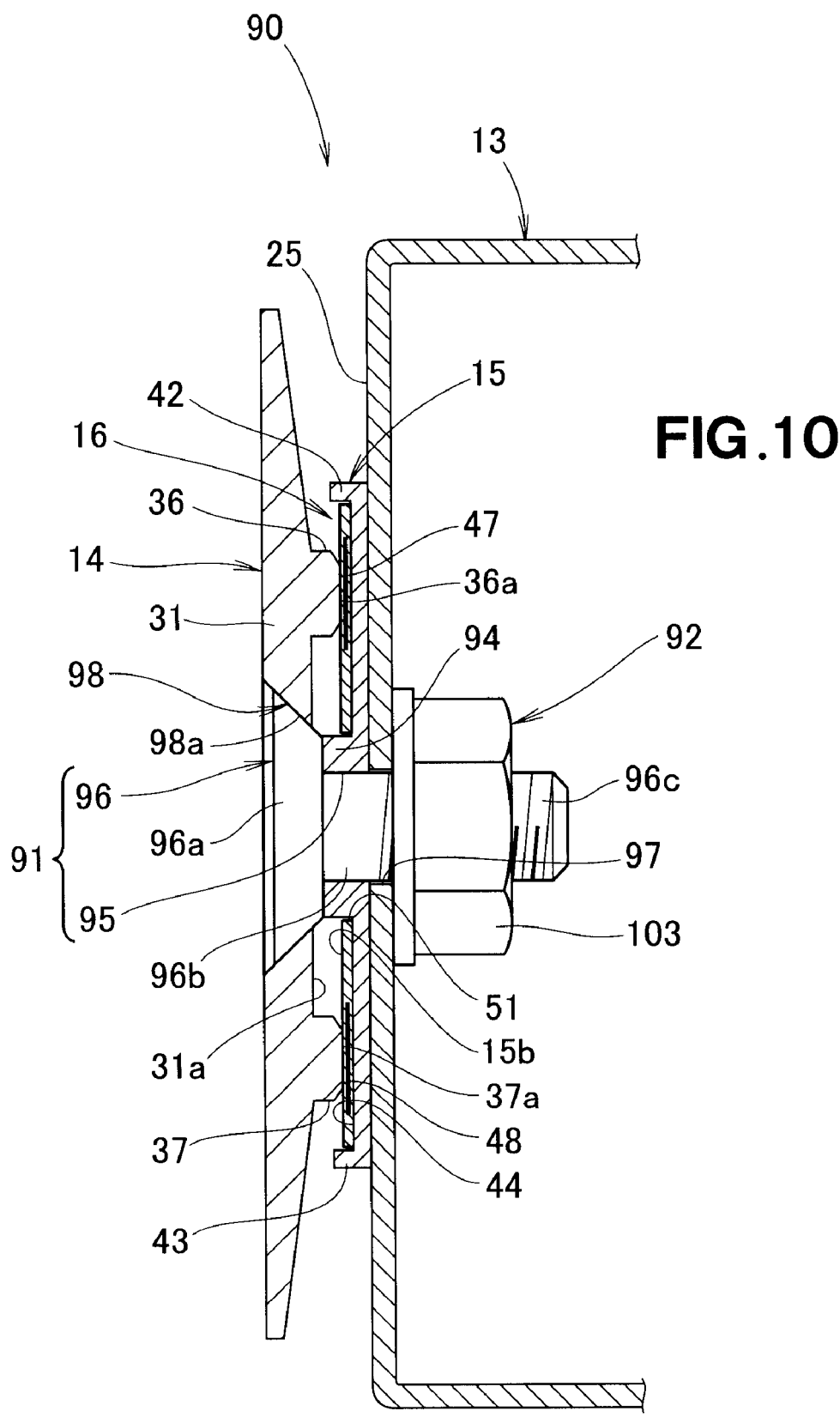
FIG. 10 is a cross-sectional view showing a sensor assembly according to a third embodiment of the present invention.
Figure 11:
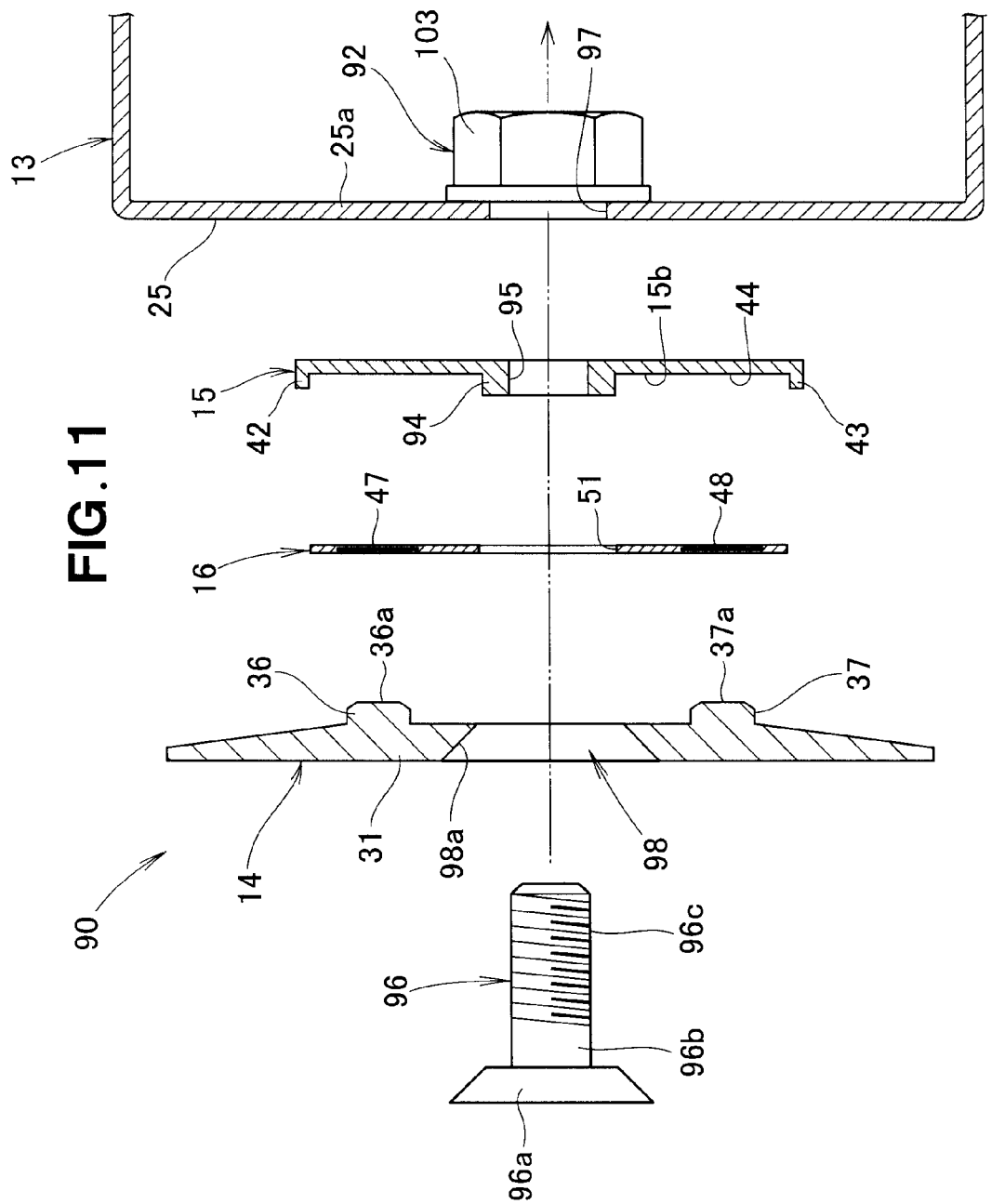
FIG. 11 is an exploded view showing the sensor assembly of FIG. 10.

FIGS. 10 and 11 show the sensor assembly of a third embodiment.

A sensor assembly 90 according to the third embodiment is provided with a positioning part 91 and a mounting part 92 instead of the positioning part 30 and the upper and lower mounting parts 34, 35 of the first embodiment shown in FIG. 3, and is otherwise configured in the same manner as the sensor assembly 10 of the first embodiment.

The positioning part 91 is provided with a plurality of mounting holes 98 formed on the beam cover 31 of the first member 14, positioning holes 95 formed in bosses 94 of the second member 15, and bolts (insertion parts) 96 that are capable of being inserted into the positioning holes 95.

The plurality of mounting holes 98 is formed at a prescribed interval in the width direction of the vehicle on the vertically central part of the beam cover 31. The rim parts of the mounting holes 98 are formed with a tapered surface 98a by gradually constricting the hole diameter toward the back of the vehicle body.

As with the bosses 53 of the first embodiment, a plurality of bosses 94 is formed at a prescribed interval in the vertical center and width direction of the vehicle on the surface 15b of the second member 15. The positioning holes 95 are formed coaxially with the bosses 94.

Hexagonal socket bolts with a hexagonal socket (not shown) formed on a countersunk head 96a can be used for the bolts 96. The bolts 96 are capable of being inserted into the positioning holes 95, and are capable of being inserted into insertion holes 97 of the front bumper panel 13.

When the bolts 96 are inserted into the mounting holes 98, the countersunk head 96a of the bolts 96 comes into contact with the tapered surface 98a of the mounting holes 98. The first member 14 is positioned by the countersunk head 96a via the mounting holes 98. The bolts 96 are introduced through the positioning holes 95, whereby underhead parts 96b of the bolts 96 are inserted into the positioning holes 95. The second member 15 is positioned by the underhead parts 96b via the positioning holes 95. The first member 14 and the second member 15 can thus be vertically positioned relative to each other using the bolts 96. The contact faces 36a, 37a of the upper and lower load-transmitting parts 36, 37 will therefore face the upper and lower sensor elements 47, 48.

The mounting part 92 is provided with the mounting holes 98 formed on the beam cover 31 of the first member 14, the bolts 96 inserted into the mounting holes 98, and nuts 103 provided to the front bumper beam 13. Specifically, the mounting holes 98 each serve a combined use as one part of the mounting part 92 and one part of the positioning part 91. The bolts 96 each serve a combined use as one part of the mounting part 92 and one part of the positioning part 91.

The nuts 103 are welded to the rear face 25a of the front wall 25 of the front bumper beam 13 so as to be coaxial with the insertion holes 97.

Next, the procedures for installing the sensor assembly 90 according to the third embodiment are described.

First, the sensor element unit 16 is bonded to the sensor-supporting face 44 of the second member 15 by using double-sided adhesive tape (not shown).

Next, the second member 15 is bonded to the front wall 25 of the front bumper beam 13 by using double-sided adhesive tape (not shown).

The bolts 96 are then introduced through the mounting holes 98 of the first member 14. The bolts 96 projecting from the mounting holes 98 are introduced through the positioning holes 95 of the second member 15 and through the insertion holes 97 of the front bumper beam 13. The underhead parts 96b of the bolts 96 are inserted into the positioning holes 95, whereby the bolts 96 are positioned in the second member 15.

A threaded part 96c of the bolts 96 projecting from the insertion holes 97 is threadably joined with the nut 103. The first member 14 is positioned and mounted to the front wall 25 of the front bumper beam 13 by bringing the countersunk heads 96a of the bolts 96 into contact with the tapered surface 98a of the mounting holes 98.

The contact face 36a of the upper load-transmitting part 36 faces the upper sensor elements 47 and the contact face 37a of the lower load-transmitting part 37 faces the lower sensor elements 48.

In this state, the contact face 36a of the upper load-transmitting part 36 and the contact face 37a of the lower load-transmitting part 37 are bonded to the sensor element unit 16 with double-sided adhesive tape or an adhesive (not shown). It is preferable that the countersunk heads 96a of the bolts 96 be in contact with the bosses 94 in this state.

The threaded part 96c of the bolts 96 is threadably joined with the nuts 103. The countersunk heads 96a of the bolts 96 contact the tapered surface 98a of the mounting holes 98. Therefore, movement of the first member 14 forward from the vehicle body is prevented.

In the sensor assembly 90 according to the third embodiment, there is no need to form insertion parts for positioning the beam cover 31 of the first member 14 since the bolts 96 of the mounting part 92 serve a combined use, and the form of the first member 14 is simplified.

In the embodiments described above, the upper and lower load-transmitting parts 36, 37 were provided in areas above and below the insertion parts 33, but it is also possible to provide a load-transmitting part in either the area above or below the insertion parts 33. In this case, sensor elements may be provided only to the area facing the load-transmitting part.

In the embodiments above, piezoelectric films were used as examples of the upper and lower sensor elements 47, 48; however, these examples are not provided by way of limitation. Other sensor elements may be used.

In the embodiments above, the front bumper beam was used as an example for the elongate article; however, this example is not provided by way of limitation. A rear bumper beam or other areas may also be used. Otherwise, it is also possible to use elongate articles that are not on vehicles.

An example was described in the embodiments above in which the second member 15 was bonded to the front wall 25 of the front bumper beam 13 with only double-sided adhesive tape; however, this example is not provided by way of limitation. It is also possible to use an adhesive in addition to double-sided adhesive tape or to use an adhesive only.

The sensor assembly of the present invention is suitable for use on an automotive vehicle provided with a piezoelectric element for outputting an electric signal in accordance with a load applied to a sensor element.

Obviously, various minor changes and modifications of the present invention are possible in light of the above teaching. It is therefore to be understood that within the scope of the appended claims the invention may be practiced otherwise than as specifically described.

What is claimed is:

1. A sensor assembly, comprising:
an elongated article secured to a vehicle body;
a sensor element comprised of at least a first elongated piezoelectric element stacked above and spaced from a second elongated piezoelectric element disposed along a longitudinal direction of the elongated article;
a first member disposed further from the vehicle body than the sensor element and having at least first and second load-transmitting parts extending toward the sensor element; and
a second member disposed between the first member and the elongated article of the vehicle body for supporting the sensor element such that the first elongated piezoelectric element is disposed on an upper portion of the second member and the second elongated piezoelectric element is disposed on a lower portion of the second member,
wherein the first member and the second member are positioned relative to each other in a vertical direction using a positioning part, whereby the first load-transmitting part is made to face the sensor element in a vertical position corresponding to that of the first elongated piezoelectric element and the second load-transmitting part is made to face the sensor element in a vertical position corresponding to that of the second elongated piezoelectric element.

2. The sensor assembly of claim 1, wherein the first member has a mounting part to be mounted to the elongated article of the vehicle body, and the mounting pant is configured so as to limit movement of the first member and the elongated article vehicle body only to a direction away from each other.

3. The sensor assembly of claim 2, wherein the positioning part is provided between the mounting part and the second member.

4. The sensor assembly of claim 1, wherein the positioning part has a plurality of positioning holes formed in the second member and a plurality of insertion parts capable of being inserted into the positioning holes, and the insertion parts are introduced through the positioning holes, whereby the first member and the second member are positioned relative to each other in the vertical direction.

5. The sensor assembly of claim 4, wherein the first load-transmitting part is provided above the insertion part and the second load-transmitting part is provided below the insertion part.

6. The sensor assembly of claim 4, wherein the first load-transmitting part and the first elongated piezoelectric element of the sensor element are provided above the insertion part and the second load-transmitting part and second elongated piezoelectric element of the sensor element are provided below the insertion part.

7. The sensor assembly of claim 1, further comprising a plurality of upper mounting parts and lower mounting parts for mounting the first member to the elongated article of the vehicle body, wherein the positioning part is at least partially provided on the first member and the first load-transmitting part is vertically positioned between the upper mounting parts and the positioning part provided on the first member and the second load-transmitting part is positioned between the lower mounting parts and the positioning part provided on the first member.

8. The sensor assembly of claim 1, wherein the first and second elongated piezoelectric elements of the sensor element are comprised of a polyvinylidene fluoride piezoelectric film, and when the sensor element is disposed on the elongated article, the longitudinal direction of the sensor element is in alignment with the longitudinal direction of the elongated article.

9. The sensor assembly of claim 1, wherein the sensor element is configured such that when a load acts in a direction that is perpendicular to a surface of the piezoelectric element, a short axis direction of the elongated sensor element becomes a sensitivity direction in which a voltage is generated, and a longitudinal direction that is a major axis direction becomes a non-sensitivity direction in which a voltage is not generated.

* * * * *

UNITED STATES PATENT AND TRADEMARK OFFICE
CERTIFICATE OF CORRECTION

PATENT NO. : 7,733,219 B2   Page 1 of 1
APPLICATION NO. : 12/187696
DATED : June 8, 2010
INVENTOR(S) : Kamei et al.

It is certified that error appears in the above-identified patent and that said Letters Patent is hereby corrected as shown below:

In Column 14, Line 6, in Claim 2, delete "pant" and insert -- part --

Signed and Sealed this

Seventeenth Day of August, 2010

David J. Kappos
*Director of the United States Patent and Trademark Office*